US012595744B1

(12) United States Patent
Peterson

(10) Patent No.: US 12,595,744 B1
(45) Date of Patent: Apr. 7, 2026

(54) INTEGRAL BRUSH SEAL COVER PLATE AND METHOD

(71) Applicant: RTX CORPORATION, Farmington, CT (US)

(72) Inventor: Christopher Peterson, Roanoke, IL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 19/023,115

(22) Filed: Jan. 15, 2025

(51) Int. Cl.
*F01D 11/08* (2006.01)

(52) U.S. Cl.
CPC .......... *F01D 11/08* (2013.01); *F05D 2240/56* (2013.01); *F05D 2260/202* (2013.01)

(58) Field of Classification Search
CPC ................. F01D 11/08; F05D 2240/56; F05D 2260/202; F16J 15/3288
See application file for complete search history.

(56) References Cited

U.S. PATENT DOCUMENTS 5,308,088 A * 5/1994 Atkinson ............. F16J 15/3288 277/355
6,244,599 B1 * 6/2001 Braun .................. F16J 15/3288 277/362
6,250,879 B1 * 6/2001 Lampes ............... F16J 15/3288 415/231
6,416,057 B1 * 7/2002 Adams ................. F16J 15/3288 277/362
6,428,009 B2 * 8/2002 Justak .................. F16J 15/3288 277/411
7,093,835 B2 8/2006 Addis
8,439,364 B2 * 5/2013 Bowsher .................. F16J 15/44 277/355
9,863,538 B2 * 1/2018 Duguay ................ F01D 25/246
10,208,674 B2 * 2/2019 Lutjen ..................... F16J 15/328
2003/0085525 A1 * 5/2003 Boston ................. F16J 15/3288 277/355
2008/0203671 A1 * 8/2008 Addis .................. F16J 15/3288 277/355
2009/0081028 A1 * 3/2009 Morgan ............... F16J 15/3292 415/174.4
2013/0170979 A1 7/2013 Sha
2019/0309856 A1 * 10/2019 Drake .................. F16J 15/3288
2020/0191006 A1 6/2020 Blaney et al.

* cited by examiner

*Primary Examiner* — Eugene G Byrd
(74) *Attorney, Agent, or Firm* — Christopher B. Kilner; MILLEN, WHITE, ZELANO & BRANIGAN, P.C.

(57) ABSTRACT

A brush seal for use with a ceramic matrix composite (CMC) component of a gas turbine engine may feed a cooling flow to the CMC component, which has a hot side configured for exposure to a hot gas path of the gas turbine engine and an opposing cold side having a cavity for feeding a cooling flow to at least one film cooling hole of the CMC component. The brush seal includes: an outer diameter (OD) backing plate; an inner diameter (ID) backing plate; a plurality of brush seal bristles sandwiched between the OD backing plate and the ID backing plate; at least one hole forming a passage extending through the OD backing plate, the brush seal bristles, and the ID backing plate; and a cover plate attached to an inner surface of the ID backing plate and configured to extend into the cavity of the CMC component.

20 Claims, 3 Drawing Sheets

INTEGRAL BRUSH SEAL COVER PLATE AND METHOD

FIELD OF THE INVENTION

The subject matter disclosed herein relates to brush seals as used between gas turbine components and, in particular, to a brush seal with an integral cover plate for use when the brush seal provides cooling flow ingress to a cavity of a ceramic matrix composite (CMC) component.

BACKGROUND OF THE INVENTION

Gas turbine engines or jet engines, in general, include a fan section, a compressor section, a combustion section, and a turbine section. Air enters through the fan section and is compressed in the compressor section before being introduced into the combustion section. In the combustion section, the air is mixed with fuel and ignited to generate a high-energy, high temperature gas flow. The high-energy, high temperature gas flow is expanded in the turbine section which is used to create thrust and to drive the compressor and fan sections.

Certain components of gas turbine engines are thus exposed to the high-energy, high temperature gas flow (flow path components). Therefore, it is desirable that such components be made of heat-resistant materials such as ceramic matrix composites (CMCs). CMC components can withstand much higher operating temperatures than components composed of superalloys. However, CMC components have comparably lower thermal conductivity. To increase their operational lifespans, precautions can be taken to cool CMC components by subjecting the components to a flow of cooling fluid (e.g., air).

For example, to protect against oxidation and recession, a CMC blade outer air seal (BOAS) or segments thereof (also known as a blade shroud or blade shroud segments) require cooling air to be delivered through internal film cooling holes to gas path surfaces. To provide cooling of such CMC components, secondary air flows, i.e., secondary to the main flow of high-energy, high temperature gas, can be used to cool or protect components of the gas turbine engines that are exposed to high temperatures by providing film cooling via a thin layer of cool gas on surfaces directly exposed to the hot gas flow. To facilitate such cooling of the CMC components, cavities can be provided within the components themselves to allow secondary cooling air to be supplied to appropriately-located film cooling holes. For example, a component such as a CMC BOAS or segment thereof can be provided with an internal cooling cavity to allow cooling air to flow to a region of the BOAS to provide film cooling to reduce its thermal deterioration due to exposure to the hot gas path.

However, given the packaging constraints within a turbine engine, the sensitivity of CMC materials to machined features, and the manufacturing difficulties involved with providing cooling circuit components with non-machining techniques (e.g., casting-like processes and the like), feeding of the cooling flow to the internal cavity of the CMC BOAS may be difficult. Additionally, when feeding the cooling air flow to an internal cavity from a "cold" side of the CMC component, undesirably-high thermal stresses may develop due to the low thermal conductivity of CMC materials.

The above information disclosed in this Background section is only for understanding of the background of the inventive concepts and, therefore, it may contain information that does not constitute prior art.

SUMMARY OF THE INVENTION

The present disclosure is directed, in a first aspect, to a brush seal for use with a ceramic matrix composite (CMC) component of a gas turbine engine, wherein the CMC component has a hot side configured for exposure to a hot gas path of the gas turbine engine and an opposing cold side having a cavity for feeding a cooling flow to at least one film cooling hole of the CMC component. The brush seal includes an outer diameter (OD) backing plate, an inner diameter (ID) backing plate, and a plurality of brush seal bristles sandwiched between the OD backing plate and the ID backing plate. The brush seal also includes at least one hole forming a passage extending through the OD backing plate, the brush seal bristles, and the ID backing plate, and a cover plate attached to an inner surface of the ID backing plate and configured to extend into the cavity of the CMC component.

In an embodiment of the brush seal, the cover plate may be dimensioned and disposed to be spaced from walls of the cavity.

In another embodiment of the brush seal, the cover plate may be welded or brazed to the ID backing plate at a proximal end.

In a further embodiment of the brush seal, the cover plate may include a least one opening in a distal end.

In yet another embodiment of the brush seal, the at least one opening may be aligned with the at least one film cooling hole in the CMC component.

In an embodiment of the brush seal, the cover plate may include a plurality of openings in the distal end that align with a plurality of film cooling holes in the CMC component.

In another embodiment of the brush seal, the ID backing plate may include a recess dimensioned to receive the proximal end of the cover plate.

In a further embodiment, the brush seal may be configured for use with a CMC component comprising a CMC BOAS.

The present disclosure is also directed, in a second aspect, to a brush seal for use with a ceramic matrix composite (CMC) BOAS of a gas turbine engine, wherein the CMC BOAS has a hot side configured for exposure to a hot gas path of the gas turbine engine and an opposing cold side having a cavity for feeding a cooling flow to at least one film cooling hole of the CMC BOAS. The brush seal includes an outer diameter (OD) backing plate, an inner diameter (ID) backing plate, and a plurality of brush seal bristles sandwiched between the OD backing plate and the ID backing plate. The brush seal further includes at least one hole forming a passage extending through the OD backing plate, the brush seal bristles, and the ID backing plate, and a cover plate attached to an inner surface of the ID backing plate and configured to extend into the cavity of the CMC BOAS, wherein: the cover plate is dimensioned and disposed to be spaced from walls of the cavity, the cover plate is welded or brazed to the ID backing plate at a proximal end, and the cover plate includes a least one opening in a distal end.

In an embodiment of this brush seal, the at least one opening may be aligned with the at least one film cooling hole in the CMC BOAS.

In another embodiment of this brush seal, the cover plate may include a plurality of openings in the distal end that align with a plurality of film cooling holes in the CMC BOAS.

In a further embodiment of this brush seal, the ID backing plate may include a recess dimensioned to receive the proximal end of the cover plate.

The present disclosure is further directed, in a third aspect, to a method of controlling thermal gradients in a film-cooled ceramic matrix composite (CMC) component of a gas turbine engine, wherein the CMC component having a hot side configured for exposure to a hot gas path of the gas turbine engine and an opposing cold side having a cavity for feeding a cooling flow to at least one film cooling hole of the CMC component. The method includes providing a brush seal adjacent the CMC component, the brush seal having: an outer diameter (OD) backing plate; an inner diameter (ID) backing plate; a plurality of brush seal bristles sandwiched between the OD backing plate and the ID backing plate; and at least one hole forming a passage extending through the OD backing plate, the brush seal bristles, and the ID backing plate. The method further includes attaching a cover plate to an inner surface of the ID backing plate that extends into the cavity of the CMC component, wherein the cover plate is dimensioned and disposed to be spaced from walls of the cavity, and wherein the cover plate includes a least one distal opening in a distal end. The method also includes feeding a cooling flow through the at least one hole to supply the at least one film cooling hole via the at least one distal opening.

In an embodiment of the method, attaching the cover plate may include welding or brazing a proximal end of the cover plate to the ID backing plate.

In another embodiment of the method, the at least one distal opening may be aligned with the at least one film cooling hole in the CMC component.

In a further embodiment of the method, the cover plate may include a plurality of distal openings in the distal end that align with a plurality of film cooling holes in the CMC component.

In yet another embodiment of the method, attaching a cover plate to the inner surface of the ID backing plate may include attaching the cover plate within a recess of the ID backing plate dimensioned to receive the proximal end of the cover plate.

In an embodiment of the method, the brush seal may be provided on a CMC component comprising a CMC BOAS.

In another embodiment of the method, the CMC BOAS may be segmented into a plurality of CMC BOAS segments, and attaching the cover plate may include attaching a plurality cover plates to the brush seal.

In a further embodiment, the method may also include inhibiting impingement cooling on a portion of the cavity on the cold side of the CMC component so at to reduce a thermal gradient within the CMC component.

BRIEF DESCRIPTION OF FIGURES

The features of the disclosure believed to be novel and the elements characteristic of the invention are set forth with particularity in the appended claims. The figures are for illustration purposes only and are not drawn to scale. The disclosure itself, however, both as to organization and method of operation, can best be understood by reference to the description of the preferred embodiment(s) which follows, taken in conjunction with the accompanying drawings in which:

DETAILED DESCRIPTION OF THE INVENTION

Figure 1:
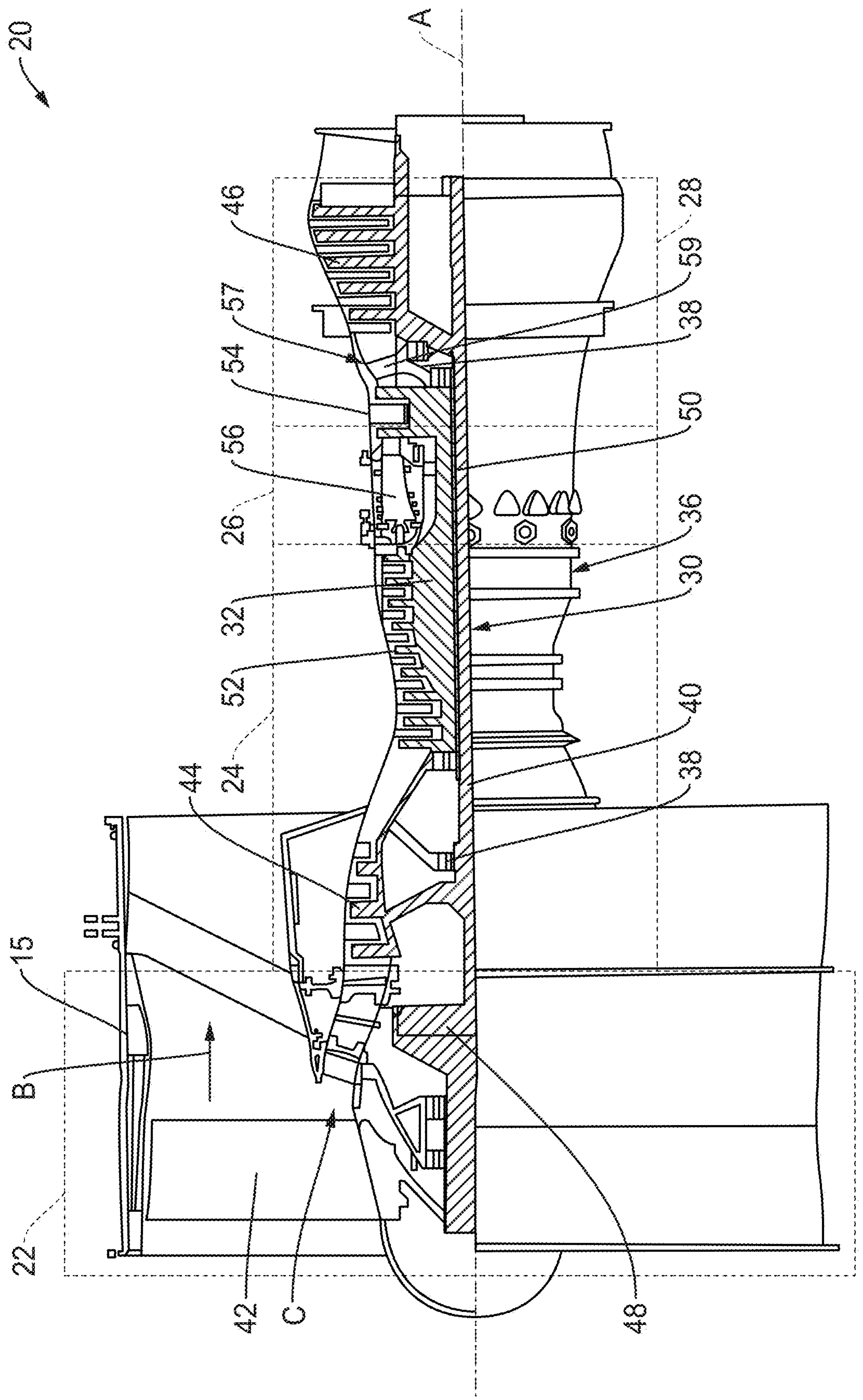
FIG. 1 schematically illustrates a partial cross section of an exemplary gas turbine engine.

The embodiments of the present disclosure can comprise, consist of, and consist essentially of the features and/or steps described herein, as well as any of the additional or optional ingredients, components, steps, or limitations described herein or would otherwise be appreciated by one of skill in the art.

The following discussion omits or only briefly describes conventional features of the disclosed technology that are apparent to those skilled in the art. Reference to a particular embodiment does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms “a,” “an,” and “the” include plural referents unless otherwise specified, and that the terms “includes” and/or “including,” when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

The devices of the present disclosure may be understood more readily by reference to the following detailed description of the embodiments taken in connection with the accompanying drawing figures, which form a part of this disclosure. It is to be understood that this application is not limited to the specific devices, methods, conditions or parameters described and/or shown herein, and that the terminology used herein is for the purpose of describing particular embodiments by way of example only and is not intended to be limiting. All spatial references, such as, for example, proximal, distal, horizontal, vertical, top, upper, lower, bottom, left and right, are for illustrative purposes only and can be varied within the scope of the disclosure. For example, the references “upper” and “lower” are relative and used only in the context to the other, and are not necessarily “superior” and “inferior.”

It will further be understood that, although the terms “first,” “second,” “third,” and the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Various examples of the disclosed technology are provided throughout this disclosure. The use of these examples is illustrative only, and in no way limits the scope and meaning of the invention or of any exemplified form. Likewise, the invention is not limited to any particular preferred embodiment(s) described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

Co-filed application Ser. No. 19/023,125 entitled "BRUSH SEAL WITH INTEGRAL COOLING CHANNEL AND METHOD," discloses a brush seal with an integral cooling channel that permits ingress of a cooling flow to a cavity in a CMC component such as a blade outer air seal (BOAS).

To protect against oxidation and recession, CMC components such as a CMC BOAS require cooling air to be delivered through internal film cooling holes to gas path surfaces to provide film cooling. Cooling air may be supplied to these gas path film cooling holes via brush seal thru-holes. However, such orifice flows have the additional effect of enhancing impingement cooling on non-gas path surfaces of a cavity forming a film cooling supply plenum, and this jet impingement reduces the temperatures of non-gas path surfaces to be significantly cooler than gas path surface temperatures. In CMC applications, this non-gas path surface impingement cooling is not always desired, as strong thermal gradients may result on a CMC component such as a BOAS with gas path film cooling and backside impingement. Thermal gradients may cause structural defects to CMC parts (cracking, delamination, spallation, etc.).

The present disclosure is directed to minimizing thermal gradients across film-cooled CMC components such as a BOAS (or segment thereof) by using a cover plate to direct cooling flow (e.g., cooling air) towards gas path film cooling holes while mitigating backside impingement cooling within a cavity forming a film cooling supply plenum.

Accordingly, the present disclosure is also directed to utilizing a metal cover plate that is brazed or welded to a brush seal to act as a barrier between free impingement flow and a CMC non-gas path surface. Cooling air flows from brush seal orifices into a cooling air supply plenum formed by the integral brush seal cover plate. This air then impinges upon the metal cover plate instead of impinging directly onto the CMC component, mitigating the impingement cooling experienced by the CMC surfaces. Cooling air is then directed to gas path film cooling holes via one or more thru-holes in the metal cover plate that are aligned with and located just outboard of gas path film cooling hole entrances. The integral brush seal cover plate shields most of the CMC non-gas path surface area from direct jet impingement, which increases the CMC component's surface temperature and brings this temperature closer to the temperature of the component's gas path surface, minimizing thermal gradients across the CMC component.

While the illustrated example and discussion below often refers to a CMC BOAS, it should be recognized that the present disclosure is not limited to a CMC BOAS but includes any CMC component for which a cooling flow cavity is used for supplying film cooling, for example, combustion liners, turbine blades, and vanes.

In the discussion below, axial refers to a direction that coincides with the longitudinal axis of the engine. Radial refers to a direction that is radial with respect to the longitudinal axis of the engine. Circumferential refers to a direction that corresponds to the circumference of a circle around the longitudinal axis of the engine. The leading edge/portion of a structure is the edge/portion that faces into the flow of the hot gases, i.e., faces upstream. The trailing edge/portion of a structure is the edge/portion that the faces away from the flow of the hot gases, i.e., faces downstream.

FIG. 1 schematically illustrates an example of a gas turbine engine 20 (i.e., a two-spool turbofan) which includes a fan section 22, a compressor section 24, a combustor section 26, and a turbine section 28. Fan section 22 drives air along a bypass flow path B in a bypass duct defined within a housing 15, and also along a core flow path C for compression in compressor section 24, with subsequent introduction into combustor section 26, followed by expansion through turbine section 28. Although FIG. 1 depicts a two-spool turbofan gas turbine engine, it should be understood that the concepts described herein are not limited to use with two-spool turbofans engines and may be applied to other types of turbine engines.

Engine 20 generally includes a low speed spool 30 and a high-speed spool 32 mounted for rotation about an engine central longitudinal axis A, relative to an engine static structure 36, via several bearing systems 38. Various bearing systems 38 at various locations may alternatively or additionally be provided. The location of bearing systems 38 may be varied as appropriate to the application.

The low speed spool 30 generally includes an inner shaft 40 that interconnects, a first (or low) pressure compressor 44 and a first (or low) pressure turbine 46. Inner shaft 40 is connected to fan 42 through a speed change mechanism, which in this exemplary embodiment is illustrated as a geared structure 48 to drive fan 42 at a lower speed than the low speed spool 30. High speed spool 32 includes an outer shaft 50 that interconnects a second (or high) pressure compressor 52 and a second (or high) pressure turbine 54. Combustor 56 is positioned between high pressure compressor 52 and high-pressure turbine 54. A mid-turbine frame 57 of the engine static structure 36 may be arranged generally between the high-pressure turbine 54 and the low-pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core air flow is first compressed by low pressure compressor 44, and then by the high-pressure compressor 52. Thereafter, the core air flow is mixed and burned with fuel in combustor 56, then expanded in high pressure turbine 54 and low-pressure turbine 46. The mid-turbine frame 57 includes airfoils 59 which are in the core airflow path C. The turbines 46 and 54 rotationally drive the respective low speed spool 30 and high-speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low-pressure compressor, or aft of the combustor section 26 or even aft of turbine section 28, and fan 42 may be positioned forward or aft of the location of gear system 48.

The turbine section 28 includes at least one rotor and at least one blade extending radially outwardly from the rotor. The turbine section 28 may further include a blade outer air seal(s) (BOAS(s)). The blade outer air seal can be an assembly of a plurality of BOAS segments that together form an annular shaped shroud around the engine's central longitudinal axis A which is positioned between an outer casing of the engine and the turbine blade(s) of the turbine section.

Figure 2A:
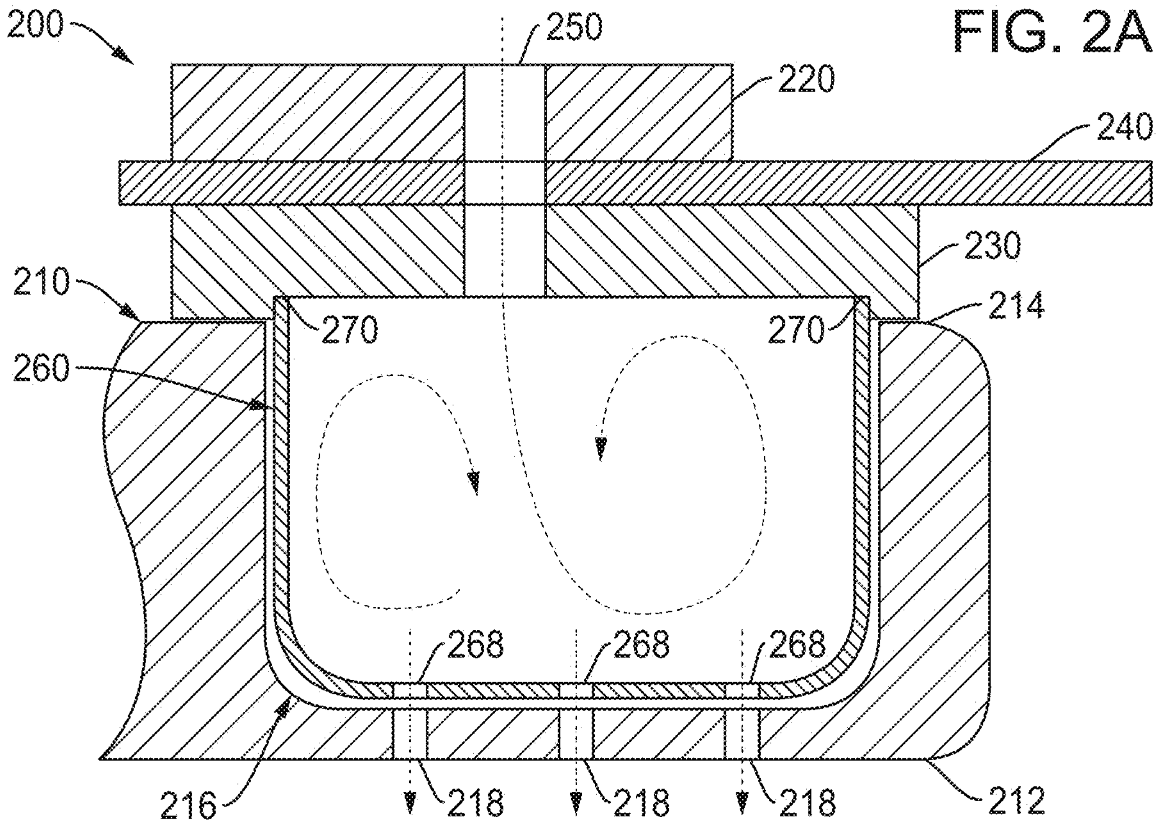
FIG. 2A schematically illustrates a partial cross section of an example embodiment of a cooling flow arrangement in accordance with the present disclosure.

With reference to FIG. 2A, an embodiment of a brush seal 200 in accordance with the present disclosure is used with a CMC component 210 of a gas turbine engine, which in this example may be a CMC BOAS. The CMC component 210 has a hot side 212 configured for exposure to a hot gas path of the gas turbine engine and an opposing cold side 214 that has a cavity 216 formed therein for feeding a cooling flow to at least one film cooling hole 218 of the CMC component 210.

The cavity 216 may have an open top that is covered by seal 200, and cavity 216 may be formed within CMC component 210 in any suitable manner, including but not limited to being initially formed in a preform or a partially-densified preform for inclusion in the densified CMC component 210, or being formed by machining and/or grinding of a densified CMC component 210.

The brush seal 200 will typically include an outer diameter (OD) backing plate 220, an inner diameter (ID) backing plate 230, and a plurality of brush seal bristles 240 sandwiched between the OD backing plate 220 and the ID backing plate 230. The OD backing plate 220, ID backing plate 230, and brush seal bristles 240 may be made of a suitable metal alloy such as high-temperature Ni and Co alloys. When Ni alloys are used, a coating may be provided on contacting portions of the ID backing plate 230 or CMC component 210 for compatibility reasons. The brush seal 200 will typically be formed as a split ring and may encompass multiple segments of CMC components 210, acting as an interstage seal.

The brush seal 200 includes at least one hole 250 forming a passage extending through the OD backing plate 220, the brush seal bristles 240, and the ID backing plate 230. Although illustrated as a single passage for ease of illustration, multiple passages may also be formed without departing from the scope of the present disclosure. The hole(s) 250 may have circular or non-circular (polygonal, elliptical, irregular, etc.) cross-section, may be straight or not (i.e., curved, segmented, etc.), and/or may vary in cross-section (e.g., expanding, contracting, or combinations thereof). When a plurality of holes 250 are included, the holes 250 may be the same size or may be of different sizes, the holes 250 may be parallel or non-parallel, and/or the holes 250 may be regularly patterned or not (e.g., irregularly patterned or a combination patterns).

The brush seal 200 also has integrated therewith a cover plate 260 that is attached to an inner surface of the ID backing plate 230 and configured to extend into the cavity 216 of the CMC component 210. Indeed, a shape of the cover plate 260 may substantially correspond to a shape of the cavity 216, but be spaced inwardly therefrom to form a small gap. As such, the cover plate 260 may be dimensioned and disposed to be spaced from walls of the cavity 216. In this arrangement, the cover plate 260 inhibits impingement cooling of the walls of cavity 216 when film cooling air is supplied through hole(s) 250 and expands into the film cooling supply plenum formed by the cavity 216.

In one or more embodiments, the cover plate 260 may be welded or brazed to the ID backing plate 230 at a proximal end 270. In an embodiment, the ID backing plate 230 may further include a recess dimensioned to receive the proximal end 270 of the cover plate 260, so as to position the cover plate 260 and include an increased surface for welding or brazing proximal end 270. As with other portions of the brush seal 200, the cover plate 260 may be made of a suitable metal alloy such as high-temperature Ni or Co alloys.

In order to provide film cooling air to film cooling holes 218 of the CMC component 210, the cover plate 260 may include a least one opening 268 in a distal end thereof. The at least one opening 268 may be aligned with the at least one film cooling hole 218 in the CMC component 210. When the CMC component includes a plurality of film cooling holes 218, the cover plate 260 may include a plurality of openings 268 in the distal end that align with the plurality of film cooling holes 218 in the CMC component 210. When positioned closely, the opening(s) 268 in cover plate 260 may directly feed the film cooling hole(s) 218 while the cover plate 260 inhibits formation of thermal stresses across the CMC component 210 due to impingement cooling.

In an embodiment of the present disclosure related to a BOAS, a brush seal 200 may be configured for use with a CMC BOAS 210 (or segment thereof) of a gas turbine engine, wherein the CMC BOAS 210 has a hot side 212 configured for exposure to a hot gas path of the gas turbine engine and an opposing cold side 214 having a cavity 216 for feeding a cooling flow to at least one film cooling hole 218 of the CMC BOAS 210. In this embodiment, the brush seal 200 include an OD backing plate 220, an ID backing plate 230, a plurality of brush seal bristles 240 sandwiched between the OD backing plate 220 and the ID backing plate 230, at least one hole 250 forming a passage extending through the OD backing plate 220, the brush seal bristles 240, and the ID backing plate 230, and a cover plate 260 attached to an inner surface of the ID backing plate 230 and configured to extend into the cavity 216 of the CMC BOAS 210.

In this embodiment, the cover plate 260 is dimensioned and disposed to be spaced from walls of the cavity 216, the cover plate 260 is welded or brazed to the ID backing plate 230 at a proximal end 270, and the cover plate 260 includes a least one opening 268 in a distal end thereof. The at least one opening 268 may be aligned with the at least one film cooling hole 218 in the CMC BOAS 210, and when the CMC BOAS includes a plurality of film cooling holes 218, the cover plate 260 may include a plurality of openings 268 in the distal end that align with the plurality of film cooling holes 218 in the CMC BOAS 210. In this embodiment with aligned opening(s) 268, the cover plate 260 prevents or minimizes cooling of the CMC material of the walls of cavity 216, which may lower thermal stresses within CMC component 210 caused by cooling of the walls near cold side 214.

Further, in this embodiment, the ID backing plate 230 may include a recess dimensioned to receive the proximal end 270 of the cover plate 260, so as to provide positioning and additional surface area for welding or brazing of the proximal end 270 of the cover plate 260 to the ID backing plate 230.

Figure 2B:
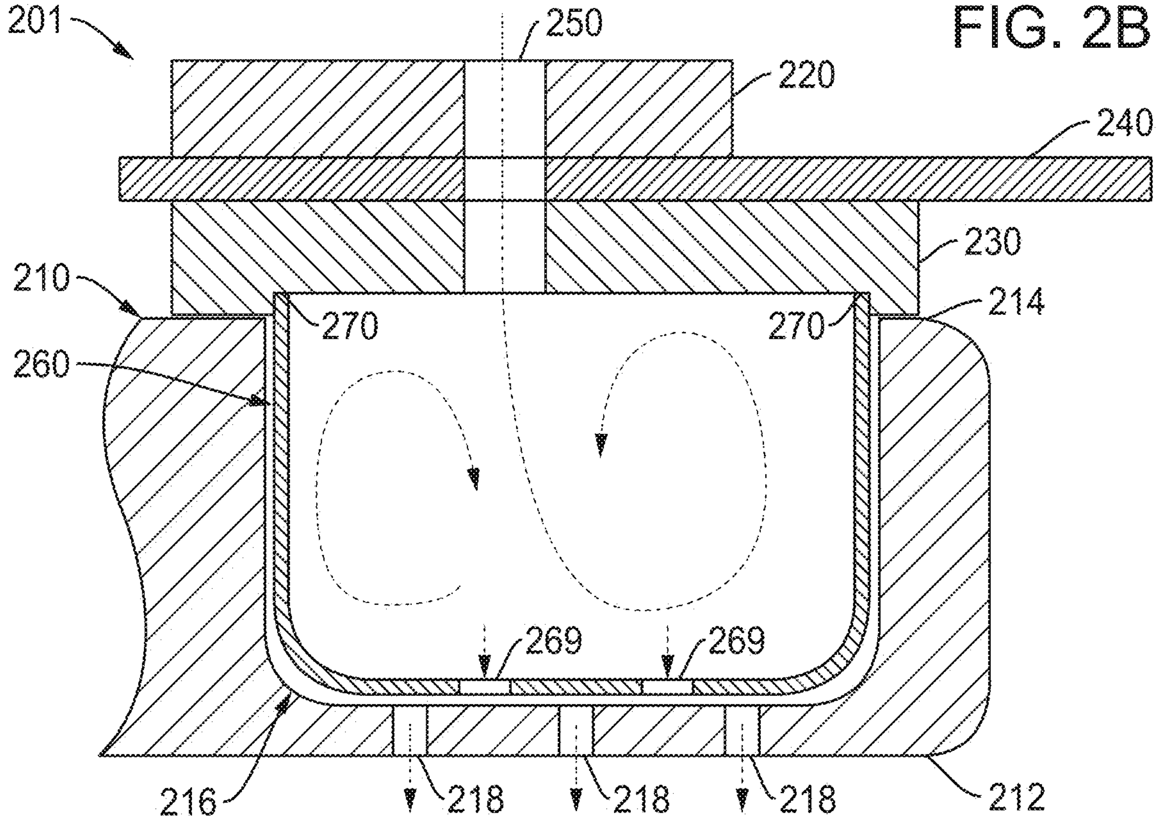
FIG. 2B schematically illustrates a partial cross section of another example embodiment of a cooling flow arrangement in accordance with the present disclosure.

Another embodiment of a brush seal 201 in accordance with the present disclosure is illustrated in FIG. 2B, which is essentially identical to the brush seal 200 of FIG. 2A with the exception of the positioning of the distal opening(s) 269 in FIG. 2B. In the embodiment of FIG. 2B, the at least one distal opening 269 is not aligned with the film cooling holes 218. Thus, the cooling flow may contact the walls of CMC component to provide cooling of the walls before being directed to the film cooling holes 218. In this embodiment with non-aligned opening(s) 269, the cover plate 260 directs cooling flow to the CMC material of the walls of cavity 216 at the distal, hot side 212, which may lower thermal stresses within CMC component 210 caused by heating of the walls near hot side 212.

Figure 3:
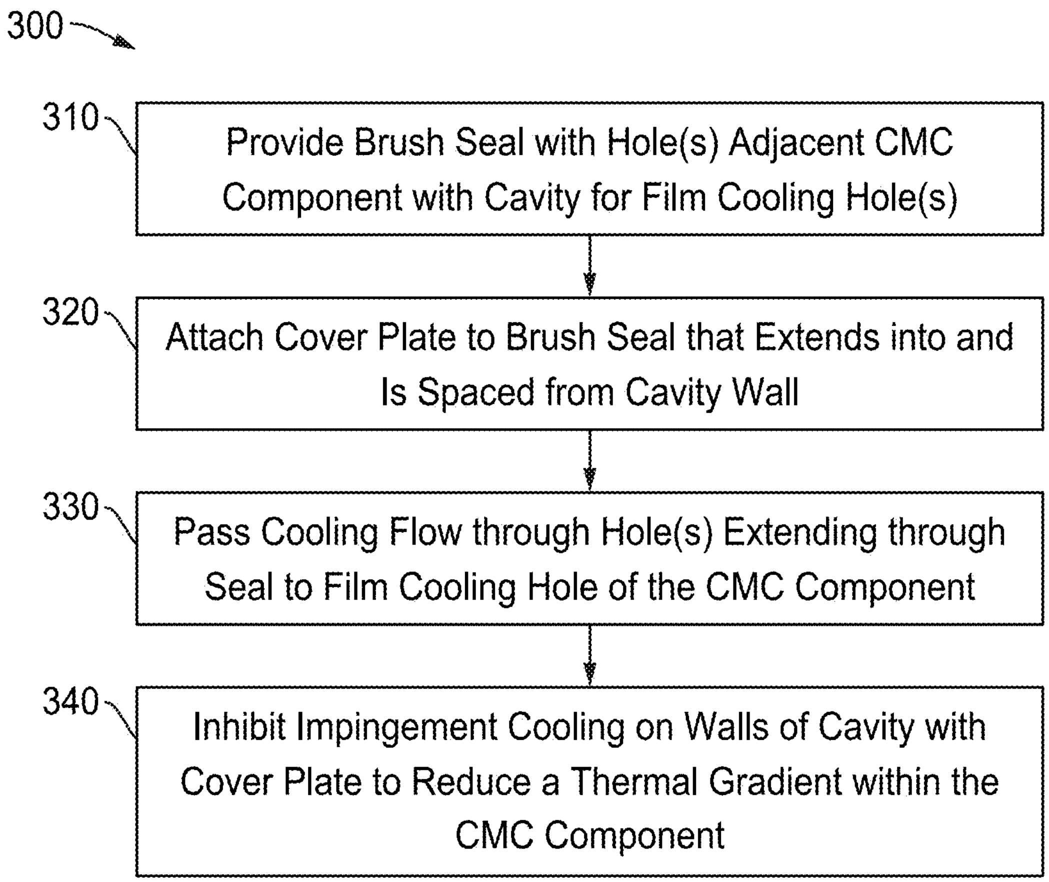
FIG. 3 is a flow diagram of an example process in accordance with the present disclosure.

Referring to FIG. 3, in another embodiment of the present disclosure, the cover plate 260 may be utilized in a method 300 of controlling thermal gradients in a CMC component of a gas turbine engine, wherein the CMC component 210 has a hot side 212 configured for exposure to a hot gas path of the gas turbine engine and an opposing cold side 214 having a cavity 216 for feeding a cooling flow to at least one film cooling hole 218 of the CMC component 210.

The method 300 includes a step 310 of providing a brush seal 200 adjacent the CMC component 210. The brush seal 200 includes an OD backing plate 220, an ID backing plate 230, and a plurality of brush seal bristles 240 sandwiched between the OD backing plate 220 and the ID backing plate 230. The brush seal 200 also includes at least one hole 250 forming a passage extending through the OD backing plate 220, the brush seal bristles 240, and the ID backing plate 230.

The method 300 also includes a step 320 of attaching a cover plate 260 to an inner surface of the ID backing plate 230 that extends into the cavity 216 of the CMC component 210. The cover plate 260 is dimensioned and disposed to be spaced from walls of the cavity 216. The cover plate also includes a least one distal opening 268 in a distal end thereof. Steps 310 and 320 may be performed in any order, and in many cases, step 320 may be performed prior to step 310.

In a next step 330, method 300 includes feeding a cooling flow through the at least one hole 250 to supply the at least one film cooling hole 218 via the at least one distal opening 268, 269.

In various embodiments of method 300, attaching the cover plate 260 may include welding or brazing a proximal end 270 of the cover plate to the ID backing plate 230.

In one or more embodiments of method 300, the at least one distal opening 268 may be aligned with the at least one film cooling hole 218 in the CMC component 210, and in embodiments wherein CMC component 210 includes a plurality of film cooling holes 218, the cover plate 260 may include a plurality of distal openings 268 in the distal end that align with the plurality of film cooling holes 218 in the CMC component 210.

In at least one embodiment of method 300, attaching a cover plate 260 to the inner surface of the ID backing plate 230 in step 320 may include attaching the cover plate 260 within a recess of the ID backing plate 230 dimensioned to receive the proximal end 270 of the cover plate 260.

In another embodiment of method 300, the brush seal 200 may be provided on a CMC component 210 in step 310 that is a CMC BOAS 210, and in a further embodiment, the CMC BOAS 210 may be segmented into a plurality of CMC BOAS segments, and attaching the cover plate 260 in step 320 may include attaching a plurality cover plates 260 to the brush seal 200.

In yet another embodiment, method 300 further includes step 340 of inhibiting impingement cooling on a portion of the cavity 216 on the cold side 212 of the CMC component 210 so at to reduce a thermal gradient within the CMC component 210.

Embodiments of the present disclosure may enhance the durability and structural capabilities of film-cooled CMC components by enabling film cooling while minimizing thermal gradients across a component's CMC substrate. Were non-gas path impingement effects not mitigated or increased through the use of the concepts of the present disclosure, a film-cooled CMC component would experience stronger thermal gradients that could lead to crack formation, coating spallation, or other non-desirable consequences.

Thus, embodiments of the present disclosure may reduce thermally-driven stresses by controlling such thermal gradients. An integral brush seal cover plate in accordance with the present disclosure allows for film cooled CMC components to operate at higher temperatures with reduced thermally-driven stresses.

While the present disclosure has been particularly described, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present disclosure.

What is claimed is:

1. A brush seal for use with a ceramic matrix composite (CMC) component of a gas turbine engine, the CMC component having a hot side configured for exposure to a hot gas path of the gas turbine engine and an opposing cold side having a cavity for feeding a cooling flow to at least one film cooling hole of the CMC component, the brush seal comprising:

an outer diameter (OD) backing plate;

an inner diameter (ID) backing plate;

a plurality of brush seal bristles sandwiched between the OD backing plate and the ID backing plate;

at least one hole forming a passage extending through the OD backing plate, the brush seal bristles, and the ID backing plate; and a cover plate attached to an inner surface of the ID backing plate and configured to extend into the cavity of the CMC component.

2. The brush seal of claim 1, wherein the cover plate is dimensioned and disposed to be spaced from walls of the cavity.

3. The brush seal of claim 2, wherein the cover plate is welded or brazed to the ID backing plate at a proximal end.

4. The brush seal of claim 3, wherein the cover plate includes a least one opening in a distal end.

5. The brush seal of claim 4, wherein the at least one opening is aligned with the at least one film cooling hole in the CMC component.

6. The brush seal of claim 5, wherein the cover plate includes a plurality of openings in the distal end that align with a plurality of film cooling holes in the CMC component.

7. The brush seal of claim 3, wherein the ID backing plate includes a recess dimensioned to receive the proximal end of the cover plate.

8. The brush seal of claim 1, wherein the brush seal is configured for use with a CMC component comprising a CMC blade outer air seal (BOAS).

9. A brush seal for use with a ceramic matrix composite (CMC) blade outer air seal (BOAS) of a gas turbine engine, the CMC BOAS having a hot side configured for exposure to a hot gas path of the gas turbine engine and an opposing cold side having a cavity for feeding a cooling flow to at least one film cooling hole of the CMC BOAS, the brush seal comprising:

an outer diameter (OD) backing plate;

an inner diameter (ID) backing plate;

a plurality of brush seal bristles sandwiched between the OD backing plate and the ID backing plate;

at least one hole forming a passage extending through the OD backing plate, the brush seal bristles, and the ID backing plate; and a cover plate attached to an inner surface of the ID backing plate and configured to extend into the cavity of the CMC BOAS, wherein:

the cover plate is dimensioned and disposed to be spaced from walls of the cavity, the cover plate is welded or brazed to the ID backing plate at a proximal end, and the cover plate includes a least one opening in a distal end.

10. The brush seal of claim 9, wherein the at least one opening is aligned with the at least one film cooling hole in the CMC BOAS.

11. The brush seal of claim 10, wherein the cover plate includes a plurality of openings in the distal end that align with a plurality of film cooling holes in the CMC BOAS.

12. The brush seal of claim 9, wherein the ID backing plate includes a recess dimensioned to receive the proximal end of the cover plate.

13. A method of controlling thermal gradients in a film-cooled ceramic matrix composite (CMC) component of a gas turbine engine, the CMC component having a hot side configured for exposure to a hot gas path of the gas turbine engine and an opposing cold side having a cavity for feeding a cooling flow to at least one film cooling hole of the CMC component, the method comprising:

providing a brush seal adjacent the CMC component, the brush seal including:

an outer diameter (OD) backing plate;

an inner diameter (ID) backing plate;

a plurality of brush seal bristles sandwiched between the OD backing plate and the ID backing plate;

at least one hole forming a passage extending through the OD backing plate, the brush seal bristles, and the ID backing plate;

attaching a cover plate to an inner surface of the ID backing plate that extends into the cavity of the CMC component, wherein the cover plate is dimensioned and disposed to be spaced from walls of the cavity, and wherein the cover plate includes a least one distal opening in a distal end; and feeding a cooling flow through the at least one hole to supply the at least one film cooling hole via the at least one distal opening.

14. The method of claim 13, wherein attaching the cover plate comprises welding or brazing a proximal end of the cover plate to the ID backing plate.

15. The method of claim 13, wherein the at least one distal opening is aligned with the at least one film cooling hole in the CMC component.

16. The method of claim 15, wherein the cover plate includes a plurality of distal openings in the distal end that align with a plurality of film cooling holes in the CMC component.

17. The method of claim 13, wherein attaching a cover plate to the inner surface of the ID backing plate includes attaching the cover plate within a recess of the ID backing plate dimensioned to receive the proximal end of the cover plate.

18. The method of claim 13, wherein the brush seal is provided on a CMC component comprising a CMC BOAS.

19. The method of claim 18, wherein the CMC BOAS is segmented into a plurality of CMC BOAS segments, and attaching the cover plate includes attaching a plurality cover plates to the brush seal.

20. The method of claim 13, further comprising inhibiting impingement cooling on a portion of the cavity on the cold side of the CMC component so at to reduce a thermal gradient within the CMC component.

* * * * *